United States Patent
Hopton et al.

(10) Patent No.: US 6,253,524 B1
(45) Date of Patent: Jul. 3, 2001

(54) REINFORCING MEMBER WITH THERMALLY EXPANSIBLE STRUCTURAL REINFORCING MATERIAL AND DIRECTIONAL SHELF

(75) Inventors: Gregory W. Hopton, Novi; Chin-Jui Chang, Troy, both of MI (US)

(73) Assignee: Sika Corporation, Madison Heights, MI (US)

( * ) Notice: Subject to any disclaimer, the term of this patent is extended or adjusted under 35 U.S.C. 154(b) by 0 days.

(21) Appl. No.: 09/494,843

(22) Filed: Jan. 31, 2000

(51) Int. Cl.[7] .......................................................... E04C 3/30
(52) U.S. Cl. ........................ 52/731.2; 52/731.6; 52/732.1; 52/735.1; 296/187
(58) Field of Search ................................. 52/731.2, 731.6, 52/732.1, 735.1; 296/187, 901, 204, 205

(56) References Cited

U.S. PATENT DOCUMENTS

| | | |
|---|---|---|
| 4,019,301 | 4/1977 | Fox . |
| 4,610,836 | 9/1986 | Wycech . |
| 4,695,343 | 9/1987 | Wycech . |
| 4,732,806 | 3/1988 | Wycech . |
| 4,737,407 | 4/1988 | Wycech . |
| 4,751,249 | 6/1988 | Wycech . |
| 4,769,391 | 9/1988 | Wycech . |
| 4,836,516 | 6/1989 | Wycech . |

(List continued on next page.)

FOREIGN PATENT DOCUMENTS

| | | |
|---|---|---|
| 2114888 | 2/1994 | (CA) . |
| 2749263 | 5/1996 | (FR) . |

OTHER PUBLICATIONS

Side view photograph of admitted prior art automobile rail reinforcing member with adhesively attached thermally expandable reinforcing material after bake–out but not shown positioned within the rail.

Perspective view of admitted prior art automobile rail reinforcing member with adhesively attached thermally expandable reinforcing material after bake–out but not shown positioned within the rail.

Photograph of section of admitted prior art SUV crossmember reinforcing member with adhesively attached thermally expandable material after bake–out located between metal structural parts of an automobile.

(List continued on next page.)

Primary Examiner—Carl D. Friedman
Assistant Examiner—Chi Nguyen
(74) Attorney, Agent, or Firm—Hovey, Williams, Timmons & Collins

(57) ABSTRACT

A reinforced structural member includes a structural member and a reinforcing member, the reinforcing member being received within a cavity of the structural member and bonded thereto by thermally expansible foaming structural reinforcing material. The reinforcing member includes a carrier, a structural reinforcing material element, a directional shelf separate from the carrier, and a fastener coupling the directional shelf to the carrier. The directional shelf includes a platform which is apertured to permit the reinforcing material to foam and expand therethrough to bond the carrier directly to an adjacent wall of the structural member. At least one directional wall extends at an oblique angle to the platform to limit the expansion of the structual reinforcing material therepast during foaming. The shelf may have two directional walls which are opposing in substantially perpendicular relationship to the platform, in acute angular relationship to the platform, or diverge extending at obtuse angles to the platform.

22 Claims, 3 Drawing Sheets

U.S. PATENT DOCUMENTS

| | | |
|---|---|---|
| 4,853,270 | 8/1989 | Wycech . |
| 4,861,097 | 8/1989 | Wycech . |
| 4,901,500 | 2/1990 | Wycech . |
| 4,908,930 | 3/1990 | Wycech . |
| 4,922,596 | 5/1990 | Wycech . |
| 4,923,902 | 5/1990 | Wycech . |
| 4,964,514 | 10/1990 | Wycech . |
| 4,978,562 | 12/1990 | Wycech . |
| 4,995,545 | 2/1991 | Wycech . |
| 5,124,186 | 6/1992 | Wycech . |
| 5,194,199 | 3/1993 | Thum . |
| 5,213,391 | 5/1993 | Takagi . |
| 5,344,208 | 9/1994 | Bien et al. . |
| 5,575,526 | 11/1996 | Wycech . |
| 5,635,562 | 6/1997 | Malcom . |
| 5,755,486 | 5/1998 | Wycech . |
| 5,766,719 | 6/1998 | Rimkus . |
| 5,806,915 * | 9/1998 | Takabatake ................ 296/187 |
| 5,884,960 | 3/1999 | Wycech . |
| 5,888,600 | 3/1999 | Wycech . |
| 5,992,923 | 11/1999 | Wycech . |
| 6,003,274 | 12/1999 | Wycech . |
| 6,058,673 | 5/2000 | Wycech . |
| 6,092,864 * | 7/2000 | Wycech et al. ............ 52/731.6 |

OTHER PUBLICATIONS

Photograph of section of admitted prior art SUV crossmember reinforcing member with adhesively attached thermally expandable material after bake–out located between metal structural parts of an automobile.

* cited by examiner

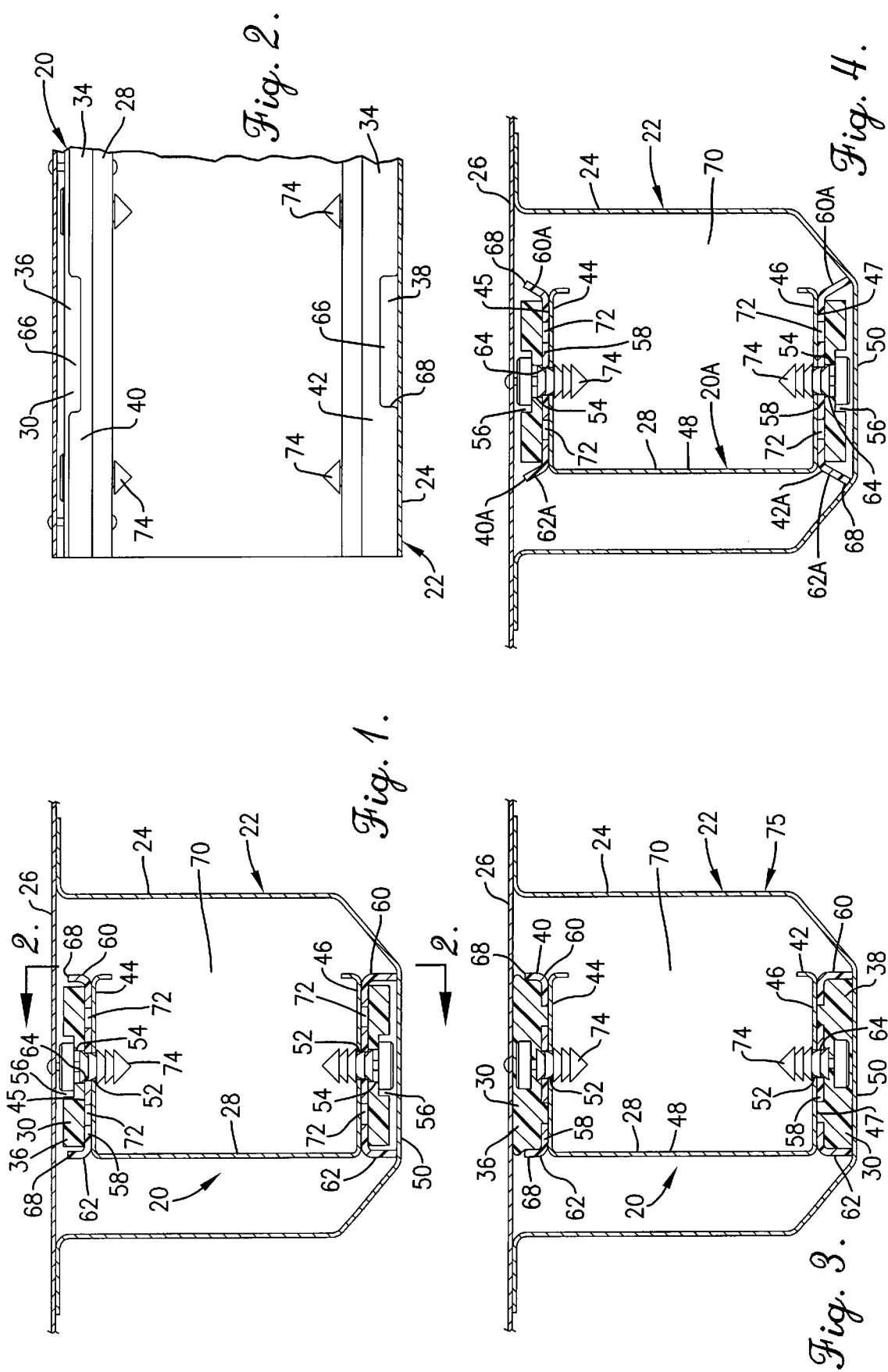

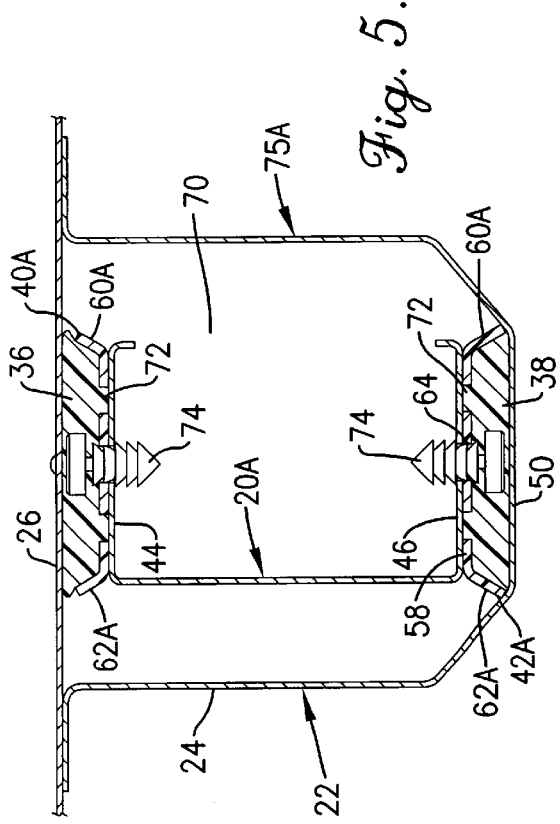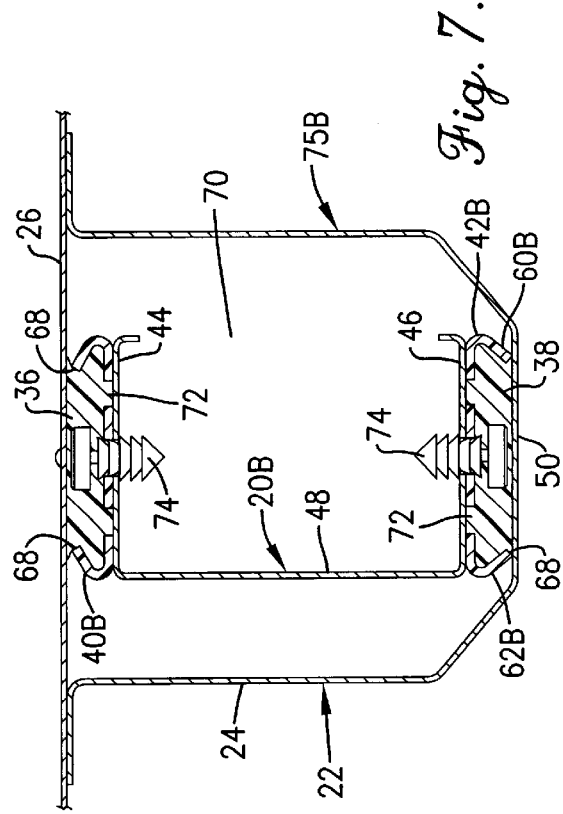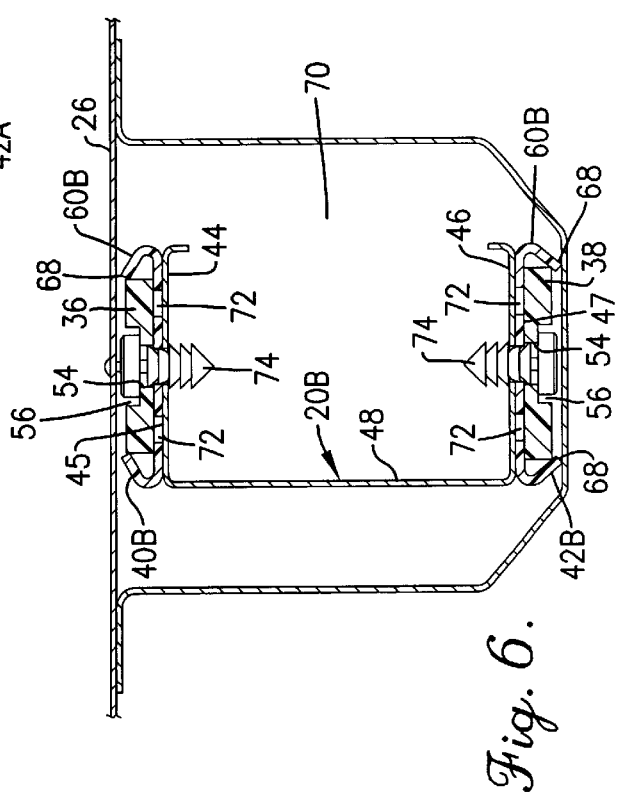

REINFORCING MEMBER WITH THERMALLY EXPANSIBLE STRUCTURAL REINFORCING MATERIAL AND DIRECTIONAL SHELF

BACKGROUND OF THE INVENTION

1. Field of the Invention

This invention concerns the use of thermally expansible foaming materials, particularly thermally expansible foaming structural reinforcing materials, which are coupled to a carrier having a directional foaming shelf mounted thereon to direct the structural reinforcing material during foaming to a particular area on a surrounding structural member giving additional localized stiffness to frames, rails, structure surrounding cavities, panels and other structural members. Such a reinforcing member may be useful in architectural, automotive, aviation, marine, or any other applications where increased support or stiffness would reduce vibration, noise and/or fatigue propagation, or would provide reinforcement to enhance structural strength or provide energy management during crash, crush or impact encounters.

2. Description of the Prior Art

It has long been recognized that foamable materials may be used to bond together separate components. Structural foams, urethanes, and other thermally expansible foaming materials have been used to enhance acoustic performance and provide structural rigidity. Examples of thermally expansible structural reinforcing materials used on carriers in the automotive field are illustrated in U.S. Pat. No. 5,194,199 to Thum, U.S. Pat. No. 5,344,208 to Bien et al., and U.S. Pat. Nos. 5,575,526 and 5,755,486 to Wycech. Another example of the use of thermally expansible materials on a carrier and used primarily as a baffle composition is shown in U.S. Pat. No. 5,506,025 to Otto et al. An example of the use of a foamable material on a beam-shaped structure in a piling is shown in U.S. Pat. No. 4,019,301 to Fox et al.

While such showings disclose various uses of expansible materials in reinforcing, baffling and sealant applications, there has developed a need for a simplified reinforcing member which will provide stiffening and reinforcement to a surrounding structural member. The use of expansible reinforcing materials which are initially dry and non-tacky are preferred in the manufacturing context. Such materials having shipping and handling advantages; notably this type of reinforcing material does not readily adhere to shipping containers, to workers during manufacture and installation, or to other critical surfaces which may come into contact with the material. By being non-tacky, these materials will not readily retain dirt, dust or other contaminants. Additionally, these materials will not readily adversely adhere to a carrier positioned within the structural member which helps to position the reinforcing member prior to expansion of the reinforcing material.

SUMMARY OF THE INVENTION

The reinforcing member of the present invention provides significant advantages over prior carrier and expansible material combinations in manufacturing, handling and use by providing directional foaming to orient and localize the expansion and bonding of the thermally expansible foaming reinforcing material to the structural member. The reinforcing member provides support to an adjacent structural member through the foamed reinforcing material positioned on a directional foaming shelf supported by the carrier, with the carrier being configured to include a mechanical fastening element to couple the thermally expansible foaming structural reinforcing material and the directional foaming shelf to the carrier. The directional foaming shelf is apertured, whereby the reinforcing material expands therethrough during foaming and thereby bonds to the carrier, the directional foaming shelf and the surrounding structural member to provide a reinforced structural member. The carrier may be provided of various configurations and is preferably designed to provide both a mounting surface which couples to the structural member and properly locates the reinforcing material and directional foaming shelf thereon and may provide additional structural reinforcement. The use of mechanical fasteners enables the initially non-tacky structural reinforcing material and directional shelf to be positioned in various locations and orientations whereby upon activation, the reinforcing material may foam, thereby expanding to bond the carrier and the directional shelf to the surrounding structure.

Broadly speaking, the present invention includes a carrier which has at least one and preferably two or more surfaces for receiving a directional foaming shelf thereon, and for coupling to the structural member. The directional foaming shelf includes a platform and two or more walls angularly oriented with respect thereto. The platform includes at least one aperture to permit the thermally expansible foaming reinforcing material to flow therethrough, whereby a bond is provided between the reinforcing material and the carrier to which the shelf is attached. The walls serve to constrain and direct the reinforcing material during foaming, thereby causing the reinforcing material to engage and bond to a particular area on the structural member and further to protect some areas against engagement with the reinforcing material after foaming and expansion. This may reduce the amount of reinforcing material required in a particular application. By providing the directional foaming shelf as a separate element from the carrier, one carrier can be used for a variety of different applications by merely substituting different directional foaming shelves. The fastener may be provided separately or as a part of the carrier, and preferably provides some yield or give to permit the material to shift upon impact and provide manufacturing tolerance. In one embodiment, the fastener may be provided as a synthetic resin pin passing through the material, the directional foaming shelf and through an opening in the carrier. In another embodiment, the fastener may be provided as a tab which may be bent to grasp the material and hold it and the directional foaming shelf to the carrier. The reinforcing member is typically received in a structural member such as a rail or channel which provides a cavity for receiving the structural member therein with the reinforcing material in engagement with or proximate to the structural member prior to activation.

The reinforcing material is thermally expansible, either by internally created thermal energy or by the external application of heat to activate the material. As used herein, the term "thermally expansible" means to foam and thereby expand by both internally created thermal energy and the external application of heat to expand and foam the reinforcing material. The thermally expansible reinforcing material is preferably a synthetic resin-based material which foams when subjected to temperatures achieved during baking in a manufacturing process (e.g., such as during the paint and powder coat bake stage of automobile manufacturing processes). Thus, the expansion temperature of the material should be at least about 300° F.

The foregoing advantages to the present invention will be readily appreciated by those skilled in the art with reference to the drawings and description which follow, which are intended to be exemplary rather than limiting.

BRIEF DESCRIPTION OF THE DRAWINGS

FIG. 1 is a vertical cross-sectional view taken through the reinforcing member with directional foaming shelf hereof, showing the reinforcing member received in the cavity of a structural member with the thermally expansible reinforcing material received on the directional foaming shelf coupled to a carrier by a fastener;

FIG. 2 is a vertical cross-sectional view of the reinforcing member taken along line 2—2 of FIG. 1, showing a recessed area in the upright walls of the directional foaming shelf;

FIG. 3 is a vertical cross-sectional member of the reinforcing member of FIG. 1 after foaming of the reinforcing material to bond the carrier, directional foaming shelf and structural member;

FIG. 4 is a vertical cross-sectional view similar to FIG. 1, showing a second embodiment of the reinforcing member with a directional foaming shelf having divergent walls which are oriented at an obtuse angle to the platform;

FIG. 5 is a vertical cross-sectional view similar to FIG. 4 showing the reinforcing member thereof after foaming of the reinforcing material to bond the carrier, directional foaming shelf and structural member;

FIG. 6 is a vertical cross-section view similar to FIG. 1, showing a third embodiment of the reinforcing member with a directional foaming shelf having convergent walls which are oriented at an acute angle to the platform;

FIG. 7 is a vertical cross-sectional view similar to FIG. 6, showing the reinforcing member thereof after foaming of the reinforcing material to bond the carrier, directional foaming shelf and structural member;

DESCRIPTION OF THE PREFERRED EMBODIMENT

Figure 8:
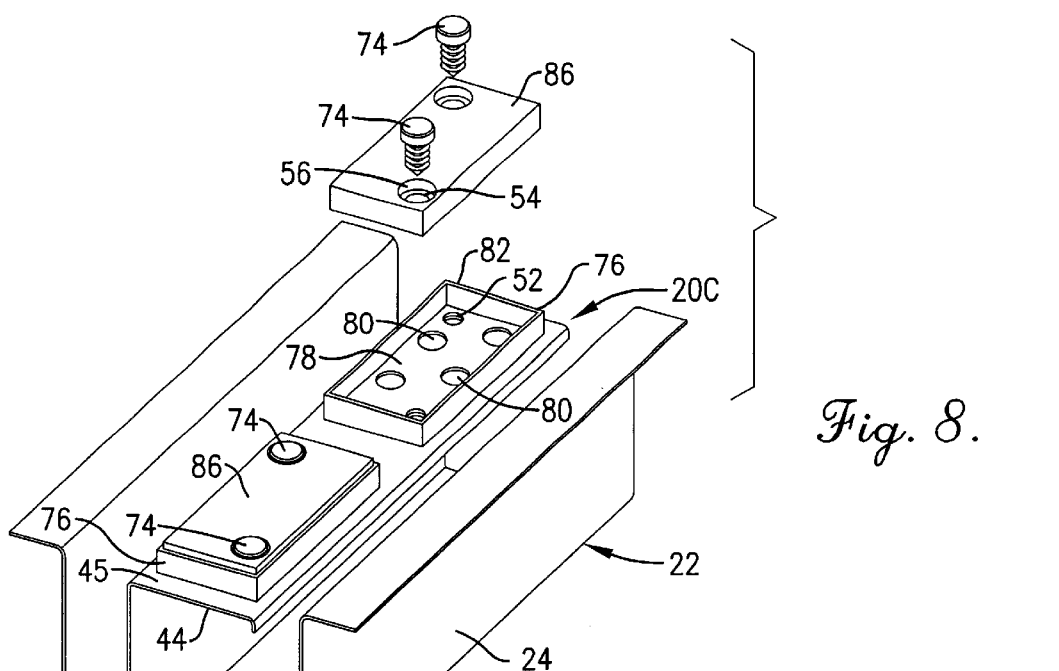
FIG. 8 is an exploded view of a fourth embodiment of the reinforcing member of the present invention, wherein the directional foaming shelf is provided with a perimeter wall which substantially encloses the reinforcing material and inhibit lateral expansion during foaming and a plurality of perforations to permit the reinforcing material to bond to the carrier.

Referring now to the drawings, a structural reinforcing member 20 in accordance with the present invention is configured for positioning in a structural member 22. The structural member 22 may include, for example, a channel 24 having a base wall and a pair of upright side walls of an automobile used as a frame member such as an engine or side rail and covered with a flat plate 26 for use as a floor pan and providing a top wall defining an enclosed cavity within the structural member. However, this is only one application for the present invention, which may be used as a component of the fuselage or wing of an aircraft, the hull or bulkhead of a boat or ship in marine applications, or as beams or components of floors, walls or ceilings of a building.

The reinforcing member 20 as shown in FIGS. 1–3 broadly includes a carrier 28, thermally expansible foaming structural reinforcing material 30, fastener 32 and at least one directional foaming shelf 34. The reinforcing material is preferably provided as discrete reinforcing material elements 36 and 38, received on respective directional foaming shelves 40 and 42, each coupled to the carrier by a fastener prior to activation. The reinforcing material elements 36 and 38 are thereby held in positions sufficiently proximate the structural member 22 to permit the reinforcing material to foam, expand and bond to the carrier 28, respective directional foaming shelves 40 and 42, and structural member 22.

In greater detail, the carrier 28 may be provided in a variety of configurations of sheet metal such as steel or aluminum, synthetic resin such as nylon, or other material having a higher melting temperature than the bake temperature to which the reinforcing member is subjected. As shown, the carrier 28 is an elongated member which is C-shaped in cross-section and has an upper arm 44 having a substantially planar first surface 45 and a lower arm 46 having a substantially planar second surface 47, the upper arm and lower arm lying in spaced apart, parallel planes and joined by a connecting wall 48 oriented substantially perpendicular thereto. While shown in an upright orientation connecting the flat plate 26 with the base wall 50 of the channel 24, it may be appreciated that the indication of upper and lower is for illustrative purposes and the carrier 28 may be positioned transversely or in various orientations. Each of the upper arm 44 and lower arm 46 include a hole 52 therethrough.

One particularly preferred composition for use as material 30 is commercialized under the name SikaReinforcer (Sika Corporation, Madison Heights, Mich.). In more detail, the most preferred material 30 comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; up to about 5% by weight butadiene acrylonitrile rubber (Nipol 1411); from about 1–10% by weight hydrated amorphous silica (HiSil 233); from about 10–20% by weight glass microspheres (Scotchlite S60); from about 0.1–5% by weight of a blowing agent such as azodicarbonamide (e.g., Celogen AZ 765®, Celogen AZ 754A®, and Celogen AZ 130®); from about 0.1–5% by weight of a catalyst such as N, N, dimethyl phenyl urea (U405); from about 0.1–5% by weight of a curing agent such as dicyandiamide (DDA10); and up to about 5% by weight of a "kicker" such as zinc oxide to lower the blowing temperature, with all percents by weight being based upon the total weight of the material taken as 100% by weight.

A particularly preferred composition of the material 30 comprises about 12.94% polystyrene, about 23.22% SBS block copolymer, about 0.57% carbon black, about 1.90% butadiene acrylonitrile rubber, about 4.28% hydrated amorphous silica, about 38.07% bisphenol A-based liquid epoxy resin, about 14.75% glass microspheres, about 0.46% zinc oxide, about 2.85% dicyandiamide, about 0.38% N,N dimethyl phenyl urea, and about 0.57% azodicarbonamide. In certain applications where increased compressive strength and reduced foaming and expansion is desired, the foregoing may be adjusted such that the polystyrene is reduced to about 12.63%, the SBS block copolymer is reduced to about 22.59%, and the butadiene acrylonitrile rubber is increased to about 2.85%.

The material 30 can be formed by mixing the SBS block co-polymer with a small portion (about 1/40th of the total amount) of the bisphenol A-based liquid epoxy resin in a heated mixer until the temperature of the mixer reaches from about 240–260° F. (the temperature of the mixture within the mixer is at least about 175° F.), and the mixture is substantially homogeneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F., the blowing agent(s), catalyst(s), kicker, and curing agent(s) are added, and mixing is resumed and continued only until the mixture is homogeneous. The resulting mixture is then preferably extruded into strands (at an extruder temperature of 170–180° F. and screw rotation speeds of about 400 rpm) and cut into pellets. The pellets are then injection molded at a temperature of about 180–200° F. using injection molding equipment designed to form the desired shape of the expansible material elements 36 and 38 to be attached to the respective directional foaming shelves 40 and 42. Each of the reinforcing material elements 36 and 38 are illustrated in the shape of a rectangular block having at least one passage 54 therethrough, the passage including a recess 56.

The directional foaming shelves 40 and 42 may be made of sheet metal such as steel or aluminum, or alternatively of nylon or other synthetic resin material having a melting point higher than the temperature of the bake oven to which the material 30 is subjected. The directional foaming shelves 40 and 42 each include a platform 58 preferably integrally formed with walls 60 and 62 obliquely angled relative thereto. The platform 58 includes at least one aperture 64 positioned in registry with the passage 54 and hole 52. As illustrated in FIGS. 1 and 3, the walls 60 and 62 may be oriented at right angles to the platform 58 to direct the foamable reinforcing material upward, as shown in FIG. 3. A relieved area 66 may be provided along the remote margin 68 of the walls 60 and 62 if localized lateral expansion during foaming is desired. The remote margin 68 may extend higher than the thickness of the reinforcing material to provide room for expansion of the reinforcing material during foaming which might otherwise cause thin-walled structural members to deform. The walls 60 and 62 of a lower directional foaming shelf 42 may thereby support the reinforcing member or, alternatively, the reinforcing member 20 may be coupled to the flat plate 32 by welding, rivets, screws, adhesive or other fasteners and be thereby secured against movement within the cavity 70 of the structural member until activation of the reinforcing material 30. Each shelf includes at least one, and preferably a plurality of openings 72 therein, whereby upon heating to melt and activate the reinforcing material 30, the reinforcing material 30 will come into direct contact with the carrier 28 to ensure good bonding between the carrier 28 and the structural member 22.

Fastener 32 may be a nylon push pin 74 as illustrated, or alternatively other fasteners. Nylon push pin 74 is inexpensive, easy to install and provides resilience against impact.

In use, the reinforcing member 20 is preferably coupled to the plate 26 by rivets or the like, and then positioned in the cavity 70 of the structural member 22 as the plate 26 is placed in covering relationship to the channel 24. Upon heating of the structural member in a bake oven to a temperature of at least 300° F., and preferably about 325° F. for a period of about 10 minutes, the reinforcing material will activate, to melt, foam and expand. The directional foaming shelves 40 and 42 cause the reinforcing material elements 36 and 38 to be directed against an opposite location on the structural member and resist lateral flow and expansion of the reinforcing material. By flowing into the openings 72, the reinforcing material bonds the carrier 28 directly to the structural member 22 without requiring the fastener 32 to bear all of the stress of any force applied therebetween. The resulting reinforced structural member 75 is then allowed to cool to ambient temperature.

FIGS. 4 and 5 illustrate a second embodiment of the reinforcing member 20A which is similar in all respects to that described above, except that instead of extending at right angles to the platform 58, the walls 60A and 62A of directional foaming shelves 40A and 42A diverge and are oriented at obtuse angles relative to the platform 58. As a result, the foamable material 30 of each element 36 and 38 is permitted to engage and bond to a wider area on the opposing surface of the structural member 22 to provide a reinforced structural member 75A.

FIGS. 6 and 7 illustrate a third embodiment of the reinforcing member 20B, which again is similar in all respects to that described above, except that instead of extending at right angles or obtuse angles to the platform 58, walls 60B and 62B of shelves 40B and 42B converge and are oriented at acute angles relative too the platform 58. As a result, the foamable material 30 of each element 36 and 38 is constrained to engage and bond to a narrower area on the opposing surface of the structural member 22 to provide a reinforced structural member 75B. Such a narrower engagement area might be desired, for example, where apertures are provided in the structural member which are proximate to one of the reinforcing material elements 36 or 38 but must remain open and unfilled, or where components which are sensitive or must be subsequently removed must be located proximate to the reinforcing member 22 and thus protected from engagement when the reinforcing material foams and expands.

Figure 9:
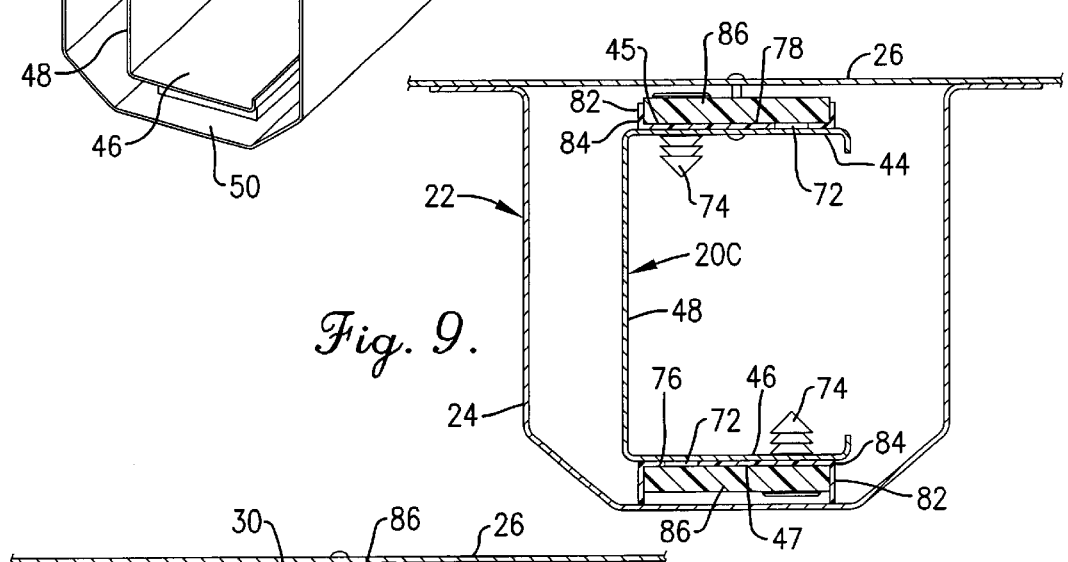
FIG. 9 is a vertical cross-sectional view thereof, showing a fastener securing the reinforcing material to the directional foaming shelf
Figure 10:
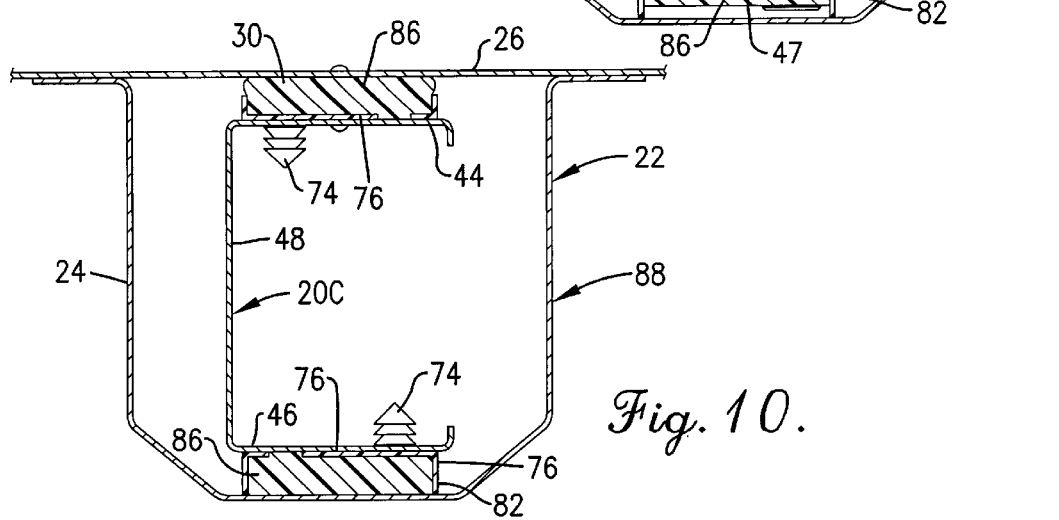
FIG. 10 is a vertical cross-sectional view similar to FIG. 9, showing the reinforcing member after foaming of the reinforcing material to bond the carrier, directional foaming shelf and structural member.

FIGS. 8, 9 and 10 illustrate a fourth embodiment of the reinforcing member 20C, which is similar to that shown in FIGS. 1–3 but wherein two directional foaming shelves 76 are provided on each of the upper arm and lower arm of the carrier 28, with each of the directional foaming shelves 76 having a platform 78 presenting a plurality of openings 80 and a perimeter wall 82 which surrounds the side margin 84 of the platform 78. The reinforcing material 30 is provided as discrete reinforcing material elements 86 which are adapted to receive push pins 74 as described above for holding the carrier 28, shelves 76 and elements 86 together prior to foaming, expansion and bonding to provide a reinforced structural member 88 as shown in FIG. 10. Use of the directional foaming shelves 76 on the reinforcing member 20C enables more precise control of the direction of the foaming and bonding of the reinforcing material 30, and may be especially beneficial when the carrier is bent transversely in a vertical direction to prevent flow of the reinforcing material along an incline, or when longitudinally spaced intervals along the structural member need to remain free of reinforcing material.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A reinforced structural member comprising:
   a structural member including a pair of spaced apart walls and defining a cavity therein;
   a reinforcing member received within said cavity and interconnecting said walls, said reinforcing member including a carrier, a structural reinforcing material element provided of a thermally expansible structural reinforcing material, a shelf separate from said carrier having a platform including at least one opening therein for permitting communication between the structural material element and said carrier and at least one directional wall obliquely angled relative to said platform, and a fastener coupling said structural reinforcing material element and said shelf to said carrier, wherein upon heating of said structural reinforcement material to a predetermined minimum temperature, the structural reinforcing material expands through said opening and bonds said carrier to said structural member and said directional wall inhibits expansion of the structural reinforcement material therepast.

2. A reinforced structural member as set forth in claim 1, wherein said carrier includes at least one arm having a substantially planar surface and said platform of said shelf is substantially parallel to said planar surface.

3. A reinforced structural member as set forth in claim 2, wherein said carrier includes a second arm having a substantially planar surface which is substantially parallel to said surface of said first arm and spaced therefrom, said first arm and said second arm being interconnected by a wall.

4. A reinforced structural member as set forth in claim 3, wherein including a second structural reinforcing material element of said thermally expansible structural reinforcing material and a second shelf having a platform including at least one opening therein for permitting communication between the structural material element and said carrier and at least one wall obliquely angled relative to said platform, and a second fastener coupling said second structural reinforcing material element and said shelf to said carrier.

5. A reinforced structural member as set forth in claim 2, including a plurality of structural reinforcing material elements of said thermally expansible structural reinforcing material, each of said plurality of structural reinforcing material elements being positioned on a platform of said shelf and coupled by a fastener to said first arm in longitudinally spaced relationship therealong.

6. A reinforced structural member as set forth in claim 1, wherein said shelf includes a second directional wall obliquely oriented relative to said platform, said structural material reinforcing element being located on said platform in engagement with both said first and second directional walls after expansion of said structural reinforcing material.

7. A reinforced structural member as set forth in claim 6, wherein said first directional wall and said second directional wall are substantially perpendicular to said platform.

8. A reinforced structural member as set forth in claim 6, wherein said first directional wall and said second directional wall are oriented at an obtuse angle to said platform.

9. A reinforced structural member as set forth in claim 8, wherein said first directional wall is opposite to said second directional wall, each of said directional walls converging toward one another.

10. A reinforced structural member as set forth in claim 6, wherein said first directional wall and said second directional wall are oriented at an acute angle to said platform.

11. A reinforced structural member as set forth in claim 10, wherein said first directional wall is opposite to said second directional wall, each of said directional walls diverging from one another.

12. A reinforced structural member as set forth in claim 11, wherein each of said first and second directional walls present an edge remote from said platform, and wherein said remote edge is located more proximate to said structural member than said structural material reinforcing element prior to expansion of said structural reinforcing material.

13. A reinforced structural member as set forth in claim 1, wherein said platform includes a side margin and said directional wall is provided as a perimeter wall substantially surrounding said side margin with said structural reinforcing material element received within said perimeter wall.

14. A reinforced structural member as set forth in claim 1, wherein said reinforcing material comprises an SBS block co-polymer, a polystyrene, a rubber, a bisphenol A-based liquid epoxy resin, carbon black, silica, glass microspheres, a blowing agent, a catalyst, and a curing agent.

15. A reinforced structural member as set forth in claim 1, wherein said fastener is a push pin.

16. A structural member adapted for receipt in a cavity of a structural member, said reinforcing member comprising:
   a carrier having a first arm presenting a first surface, a second arm presenting a second surface, and an interconnecting wall spacing said first surface from said second surface;
   a first shelf separate from said carrier and having a platform and at least one directional wall obliquely angled relative to said carrier, said platform including at least one opening for enabling the passage of said structural material therethrough during foaming;
   a first structural reinforcing material element provided of a thermally expansible structural reinforcing material received on said platform; and
   a fastener coupling said first structural reinforcing element and said first shelf to said first surface of said first arm.

17. A structural reinforcing member as set forth in claim 16, including a second shelf separate from said carrier and having a platform and a directional wall, and a second structural reinforcing material element received on said second shelf and coupled to said second arm by a second fastener.

18. A structural reinforcing member as set forth in claim 17, wherein said first shelf is positioned on said first arm to direct the foaming of said first reinforcing material element away from said second arm.

19. A structural reinforcing member as set forth in claim 18, wherein said second shelf is positioned on said second arm to direct the foaming of said first reinforcing material element away from said second arm.

20. A structural reinforcing member as set forth in claim 16, wherein said shelf includes first and second opposed directional walls obliquely angled relative to said platform, said structural reinforcing material element being received on said platform between said directional walls.

21. A structural reinforcing member as set forth in claim 16, wherein said platform includes a side margin and said directional wall is provided as a perimeter wall substantially surrounding said side margin with said structural reinforcing material element received within said perimeter wall.

22. A structural reinforcing member as set forth in claim 16, wherein said reinforcing material comprises an SBS block co-polymer, a polystyrene, a rubber, a bisphenol A-based liquid epoxy resin, carbon black, silica, glass microspheres, a blowing agent, a catalyst, and a curing agent.

* * * * *